United States Patent
Riepl et al.

(10) Patent No.: US 9,410,498 B2
(45) Date of Patent: Aug. 9, 2016

(54) METHOD AND DEVICE FOR OPERATING A HIGH-PRESSURE ACCUMULATOR FUEL INJECTION SYSTEM FOR AN INTERNAL COMBUSTION ENGINE

(75) Inventors: Hans Riepl, Hemau (DE); Christoph Klesse, Wörth A.D.Donau (DE); Daniel Anetsberger, Regensburg (DE); Tobias Ritsch, Dieterskirchen (DE); Thomas Kraft, Obertraubling (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 533 days.

(21) Appl. No.: 13/819,082

(22) PCT Filed: Aug. 17, 2011

(86) PCT No.: PCT/EP2011/064177
§ 371 (c)(1),
(2), (4) Date: Apr. 29, 2013

(87) PCT Pub. No.: WO2012/025442
PCT Pub. Date: Mar. 1, 2012

(65) Prior Publication Data
US 2013/0206111 A1   Aug. 15, 2013

(30) Foreign Application Priority Data

Aug. 27, 2010  (DE) .......................... 10 2010 039 874

(51) Int. Cl.
*F02D 41/38* (2006.01)
*F02M 59/44* (2006.01)
(Continued)

(52) U.S. Cl.
CPC ............ *F02D 41/38* (2013.01); *F02D 41/3845* (2013.01); *F02M 59/447* (2013.01);
(Continued)

(58) Field of Classification Search
CPC ..... F02D 41/38; F02D 33/006; F02D 41/065; F02D 41/3845; F02M 59/447; F02N 11/0818; F02N 11/0814
See application file for complete search history.

(56) References Cited

U.S. PATENT DOCUMENTS 6,119,655 A * 9/2000 Heinitz et al. ................. 123/447
7,370,638 B2  5/2008 Hayakawa .................... 123/467
(Continued)

FOREIGN PATENT DOCUMENTS

CN  1934343 A  3/2007  .............. F02D 41/10
CN  1978881 A  6/2007  .............. F02D 41/14
(Continued)

OTHER PUBLICATIONS

International Search Report and Written Opinion, Application No. PCT/EP2011/064177, 10 pages, Nov. 11, 2011.

*Primary Examiner* — Lindsay Low
*Assistant Examiner* — Jacob Amick
(74) *Attorney, Agent, or Firm* — Slayden Grubert Beard PLLC

(57) ABSTRACT

A method is disclosed for operating a high-pressure accumulator fuel injection system for an internal combustion engine of a motor vehicle which has a stop-start automatic function by way of which the internal combustion engine can be switched off and restarted afterwards independent of the intervention of the driver of the motor vehicle, the fuel being conveyed to the high-pressure accumulator as needed by means of a high-pressure pump and the pressure of the fuel being adjusted on the pressure side by means of a pressure control valve which is electrically actuated and open when de-energized. According to the method, the supply with power of the pressure control valve is adapted to the prevailing pressure in the high-pressure accumulator during a stop phase within a stop-start cycle.

12 Claims, 3 Drawing Sheets

(51) Int. Cl.
*F02N 11/08* (2006.01)
*F02D 41/24* (2006.01)
*F02M 59/36* (2006.01)
*F02D 41/04* (2006.01)

(52) U.S. Cl.
CPC ........ *F02N11/0814* (2013.01); *F02N 11/0818* (2013.01); *F02D 41/042* (2013.01); *F02D 41/2422* (2013.01); *F02D 2200/0602* (2013.01); *F02D 2200/0606* (2013.01); *F02M 59/368* (2013.01); *Y02T 10/48* (2013.01)

(56) References Cited

U.S. PATENT DOCUMENTS

| | | | |
|---|---|---|---|
| 7,784,281 | B2 | 8/2010 | Kotou et al. ................... 60/700 |
| 2005/0103313 | A1 | 5/2005 | Lemoure ...................... 123/458 |
| 2011/0040477 | A1 | 2/2011 | Eser et al. ..................... 701/112 |
| 2011/0213546 | A1 | 9/2011 | Anetsberger et al. ......... 701/103 |
| 2012/0097131 | A1 | 4/2012 | Dölker .......................... 123/456 |
| 2013/0206111 | A1 | 8/2013 | Riepl et al. .................... 123/478 |

FOREIGN PATENT DOCUMENTS

| | | | | |
|---|---|---|---|---|
| DE | 19752025 | A1 | 7/1999 | ............. F02D 41/24 |
| DE | 19802583 | A1 | 8/1999 | ............. F02D 41/20 |
| DE | 10261446 | A1 | 7/2004 | ............. F02D 41/12 |
| DE | 102008020184 | A1 | 11/2009 | ............. F02N 99/00 |
| DE | 102008020185 | A1 | 11/2009 | ............. F02N 99/00 |
| DE | 102008002174 | A1 | 12/2009 | ............. F02M 37/00 |
| DE | 102008055747 | A1 | 5/2010 | ............... F02D 1/06 |
| DE | 102009031528 | B3 | 11/2010 | ............. F02D 41/38 |
| GB | 2331597 | A | 5/1999 | ............. F02D 41/24 |
| WO | 2012/025442 | A1 | 3/2012 | ............. F02D 41/38 |

\* cited by examiner

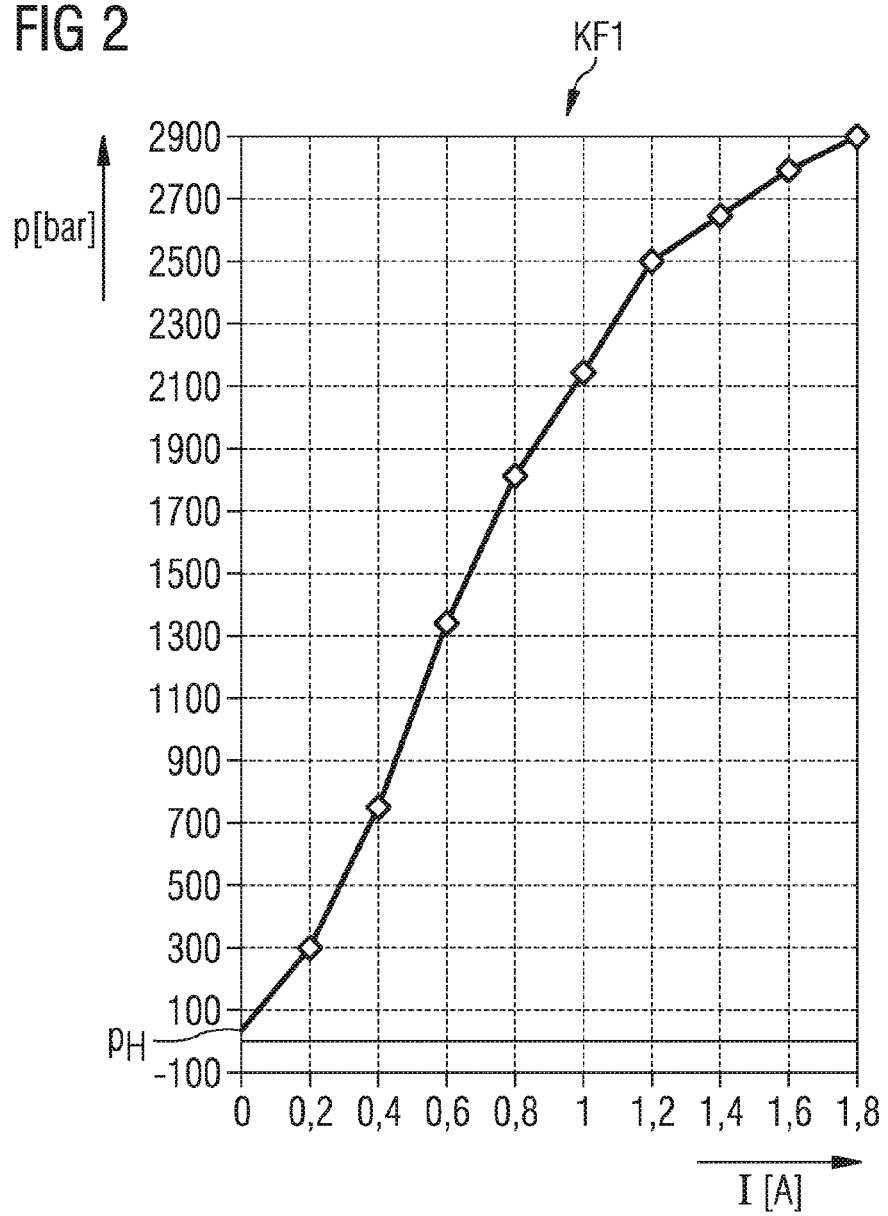

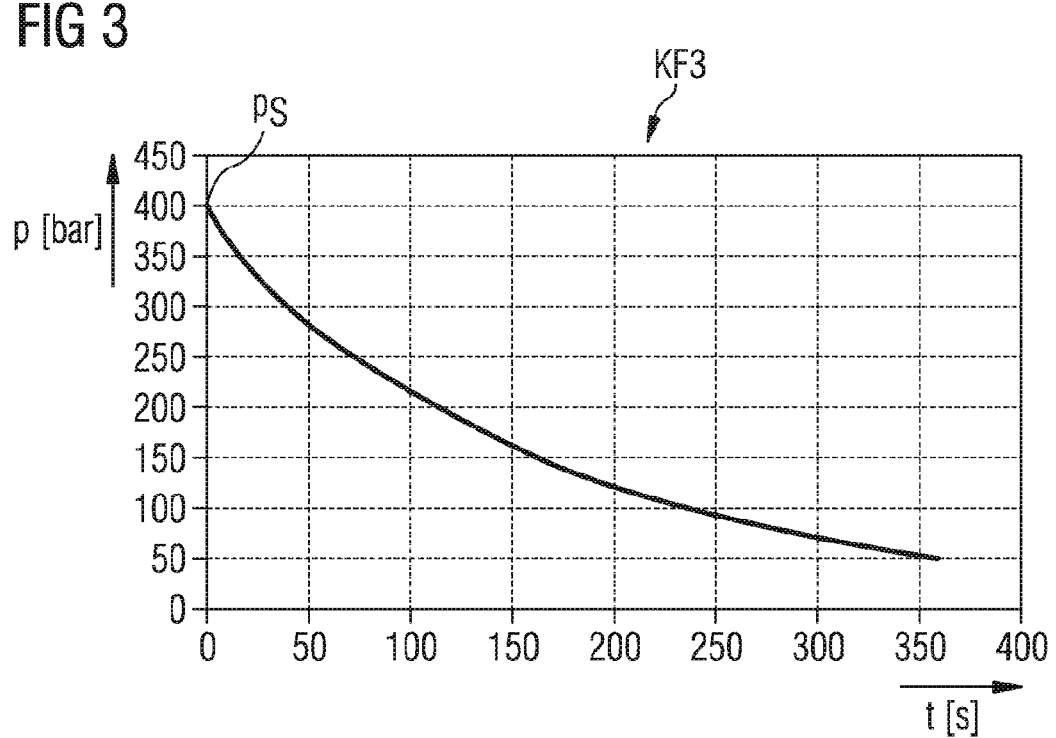

METHOD AND DEVICE FOR OPERATING A HIGH-PRESSURE ACCUMULATOR FUEL INJECTION SYSTEM FOR AN INTERNAL COMBUSTION ENGINE

CROSS-REFERENCE TO RELATED APPLICATIONS

This application is a U.S. National Stage Application of International Application No. PCT/EP2011/064177 filed Aug. 17, 2011, which designates the United States of America, and claims priority to DE Application No. 10 2010 039 874.8 filed Aug. 27, 2010, the contents of which are hereby incorporated by reference in their entirety.

TECHNICAL FIELD

The disclosure relates to a method and to a device for operating a high-pressure accumulator fuel injection system for an internal combustion engine.

BACKGROUND

Modern motor vehicles have internal combustion engines with direct fuel injection in which the fuel is injected under high pressure directly into the combustion chamber, or combustion chambers in the case of multi-cylinder internal combustion engines. Such direct fuel injection requires a fuel supply device which makes available pressurized fuel in every operating situation. Significant elements of this fuel supply device are the high-pressure pump, which feeds the fuel at the necessary pressure level, and a pressure accumulator (rail) in which the fuel is stored under high pressure and from which the injection valves are supplied with fuel. In addition to the storage of pressure, the rail also serves to smooth pressure pulsations, for which a sufficient storage volume is necessary.

Such pressure accumulators are used, in particular, in high-pressure accumulator injection systems which are combined under the term "common rail" and which permit the injection pressure to be kept independent of the rotational speed of the internal combustion engine and of the injection quantity, and, furthermore, make it possible to raise the injection pressure to, for example, approximately 2000 bar. In these common rail injection systems, fuel from a fuel tank is fed by a high-pressure pump into the pressure accumulator, via which the fuel is present at injection valves which are each arranged in the cylinder heads of the internal combustion engine. The opening and closing of the injection valves generally takes place by means of electrically open-loop or closed-loop controlled actuators.

Endeavors by automobile manufacturers to reduce further fuel consumption and the emissions of motor vehicles have involved the development of new technologies such as, for example, the automatic stop/start function by means of which the internal combustion engine can be deactivated automatically independently of the intervention by a motor vehicle driver and can also be started automatically again without activating the ignition key or the starter knob, for example by the accelerator pedal or clutch pedal being touched by the driver's foot. The deactivation of the internal combustion engine takes place here, in particular, in relatively long idling phases in which the drive force of the internal combustion engine is not required. In this way it is possible to achieve considerable savings in terms of fuel consumption, particularly in town centre traffic with many stops at traffic lights.

Stop/start devices for internal combustion engines of motor vehicles are known, for example, from DE 10 2008 020 184 A1 and DE 10 2008 020 185 A1.

However, when such automatic stop/start functions are used, difficulties can occur in the fuel supply when the internal combustion engine is restarted. It is important here that the time between the activation, that is to say the issuing of the starting request and the actual starting of the internal combustion engine, is kept as short as possible.

Specifically in diesel common rail systems it is extremely important to achieve a very rapid pressure build-up up to the injection release pressure when using a stop/start strategy.

In order to implement a stop/start functionality, different concepts can be employed depending on the components used in the high-pressure accumulator fuel injection system and, in particular, depending on the design of the high-pressure pump and of the injectors. Given a sufficiently large swept volume of the high-pressure pump, it is possible to build up within a defined time a pressure in the pressure accumulator (rail) which is larger than the injection release pressure (for example 80 bar). If low-leakage or leakage-free injectors are used in the high-pressure accumulator fuel injection system, use may also be made of what is referred to as a pressure holding function, in which the pressure in the pressure accumulator is held in the system for as long as possible.

If low-leakage or leakage-free injectors are used, depending on the pressure reduction strategy in the system a high-pressure control valve, referred to below for the sake of simplification as a pressure control valve (PCV), is necessary to achieve the pressure reduction times required by the automobile manufacturers.

If such a pressure control valve is embodied as a "normally open" design (when the electrical voltage is switched off a free through-flow of the fuel is possible), said valve has a defined holding pressure (for example 10-70 bar). If a fuel pressure in the system is held over the entire engine stop phase (for example 60-90 seconds in duration) within a stop/start cycle which is above the corresponding holding pressure, specifically at least the injection release pressure of the injectors which are used, the pressure control valve has to be supplied with electric current in order to prevent fuel from being removed from the pressure accumulator through the pressure control valve.

As a result of the necessary application of electric current, shortened below to energizing or energization, during the stop phase, electrical power is consumed. Since the internal combustion engine is deactivated in this phase and the generator (alternator) therefore cannot charge the vehicle accumulator, this has an adverse effect on the energy balance.

Hitherto, the requirements made of a stop/start functionality may be implemented by means of the most rapid possible pressure build-up at the start of the internal combustion engine.

If a pressure control valve with a normally closed function is used in high-pressure accumulator fuel injection systems with a pressure holding functionality, no energization is necessary during the stop phase. However, the use of such pressure control valves entails relatively high costs.

Furthermore, energizing a normally open pressure control valve during the stop phase by increasing the holding pressure can be reduced or avoided. However this increase is in conflict with the requirement for the lowest possible rail pressures during the idling of the internal combustion engine in order to reduce the noise level.

SUMMARY

One embodiment provides a method for operating a high-pressure accumulator fuel injection system for an internal combustion engine of a motor vehicle which has an automatic stop/start function by means of which the internal combustion engine can be deactivated and subsequently started again independently of an intervention by the motor vehicle driver, in which fuel is fed to a high-pressure accumulator by means of a high-pressure pump, to which high-pressure accumulator at least one injector is connected in order to inject fuel into at least one cylinder of the internal combustion engine, and the pressure of the fuel is set at the high-pressure end by means of an electrically activated pressure control valve which is open in the currentless state, wherein during a stop phase within a stop/start cycle the level of the electric current for supplying the pressure control valve is adapted to the prevailing pressure in the high-pressure accumulator.

In a further embodiment, the level of the electric current is reduced as a function of the pressure drop in the high-pressure accumulator.

In a further embodiment, the level of the electric current is reduced only to such an extent that the minimum injection release pressure of the at least one injector is not undershot.

In a further embodiment, the pressure in the high-pressure accumulator is measured by means of a pressure sensor and the pressure values which are obtained in this way serve as input variables of a characteristic diagram in which associated values of the actuation current are stored as a function of the pressure.

In a further embodiment, when the internal combustion engine is deactivated, a) the pressure in the high-pressure accumulator is determined and said pressure serves as an input variable of a characteristic diagram in which a pressure reduction curve of the high-pressure accumulator fuel injector system plotted against the time is stored, b) after expiry of a predetermined time period the pressure value which is associated with this time is read out of the characteristic diagram, c) this pressure value serves as an input variable of a characteristic diagram in which associated values of the actuation current are stored as a function of the pressure, and d) the steps b)-c) are repeated at predetermined time intervals.

In a further embodiment, the temperature of the fuel is taken into account in the determination of the values of the electric current.

Another embodiment provides a device for operating a high-pressure accumulator fuel injection system for an internal combustion engine of a motor vehicle which has an automatic stop/start function by means of which the internal combustion engine can be deactivated and subsequently started again independently of intervention by the motor vehicle driver, in which fuel is fed to a high-pressure accumulator by means of a high-pressure pump, to which high-pressure accumulator at least one injector is connected in order to inject fuel into at least one cylinder of the internal combustion engine, and the pressure of the fuel is set at the high-pressure end by means of an electrically activated pressure control valve which is open in the currentless state, wherein the device is configured to adapt, during a stop phase within a stop/start cycle, the level of the electric current for supplying the pressure control valve to the prevailing pressure in the high-pressure accumulator.

BRIEF DESCRIPTION OF THE DRAWINGS

Example embodiments and aspects are explained in more detail below with reference to the drawing, in which:

FIG. 2 shows a diagram which shows the relationship between the pressure and electric actuation current of a pressure control valve, and FIG. 3 shows a diagram which shows the pressure reduction over time in a high-pressure accumulator fuel injection system.

DETAILED DESCRIPTION

Figure 1:
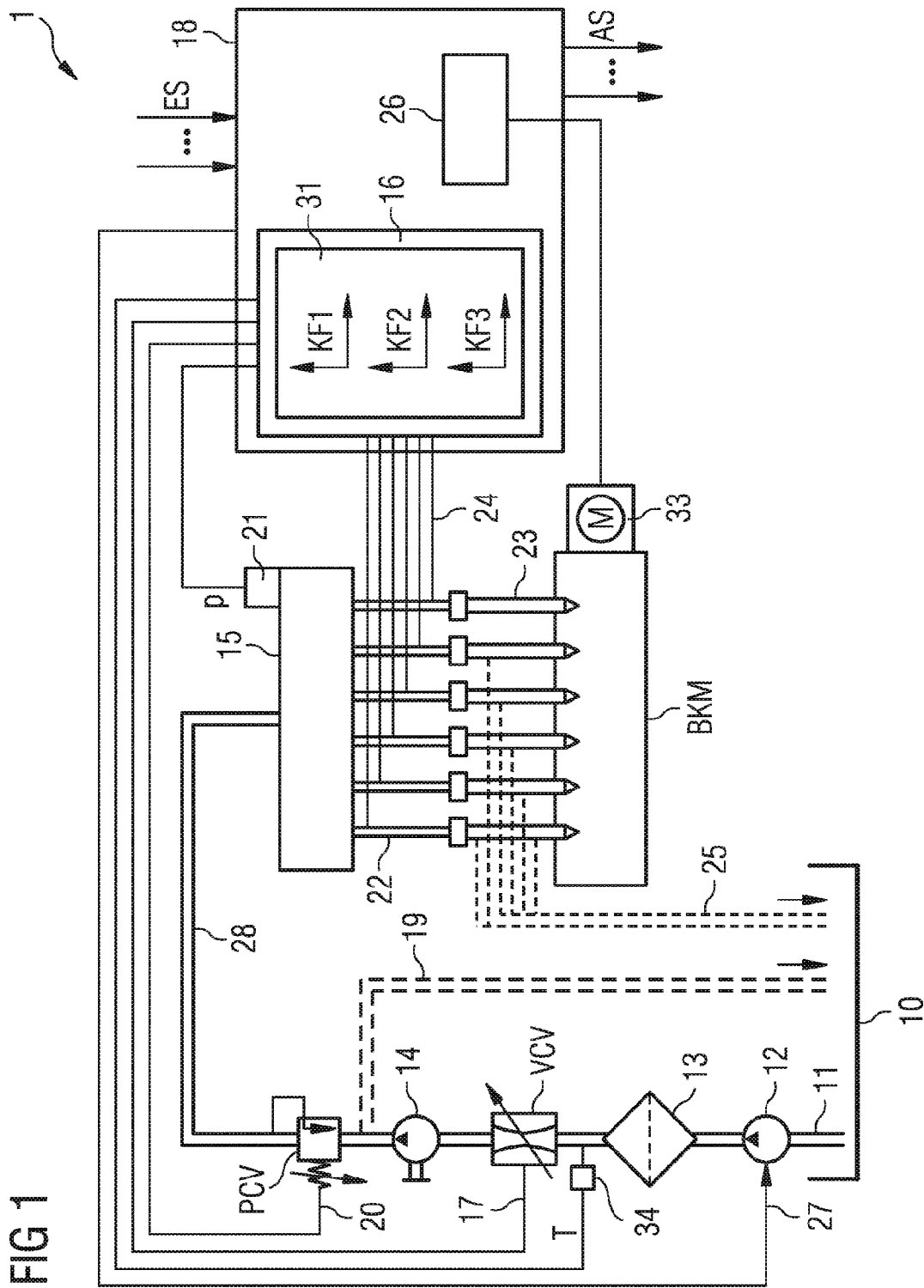
FIG. 1 shows a schematic illustration of a high-pressure accumulator fuel injection system for an internal combustion engine, according to one embodiment.

Some embodiments provide an improved method and device for operating a high-pressure accumulator fuel injection system for an internal combustion engine equipped with an automatic stop/start automatic function.

For example, some embodiments provide a method for operating a high-pressure accumulator fuel injection system for an internal combustion engine of a motor vehicle which has an automatic stop/start function by means of which the internal combustion engine can be deactivated and subsequently started again independently of an intervention by the motor vehicle driver, and in which fuel is fed according to requirements to a high-pressure accumulator by means of a high-pressure pump, and the required pressure reduction is implemented on the high-pressure side with the aid of an electrically activated pressure control valve which is open in the currentless state. During a stop phase within a stop/start cycle, the level of the electric current for supplying the pressure control valve is adapted to the prevailing pressure in the high-pressure accumulator.

Applying electric current to a normally open pressure control valve according to requirements during what is referred to as the pressure holding phase (the internal combustion engine stop) permits the power takeup of the pressure control valve to be reduced by reducing the level of the electric current over time in a way analogous to the pressure loss in the high-pressure accumulator fuel injection system. This improves the energy balance of the motor vehicle, associated with a reduction in the emission of $CO_2$.

In one embodiment, the pressure in the high-pressure accumulator is detected by means of a pressure sensor and the pressure values which are obtained in this way serve as input variables of a characteristic diagram in which associated values of the actuation current are stored as a function of the pressure.

By using the pressure/current characteristic curve of the pressure control valve it is very easily possible to obtain reduced values for the electric current for supplying the pressure control valve during the stop phase. No additional components are necessary since the input variable of this characteristic curve is supplied by a pressure sensor which is present in any case in the high-pressure accumulator fuel injector system and whose signal serves to control the pressure during the normal operation of the internal combustion engine, that is to say outside the stop/start operating mode.

Even more precise adaptation of the values for the actuation current of the pressure control valve is obtained if, in addition to the determination of the current values, the temperature of the fuel on the high-pressure side is taken into account.

FIG. 1 shows in a schematic form the design of a high-pressure accumulator fuel injection system for an internal combustion engine BKM as is used under the designation common rail system, in particular in vehicles having a diesel internal combustion engine.

In this high-pressure accumulator fuel injection system 1 fuel is sucked in from a fuel reservoir container 10 by a pre-delivery pump 12 via a low-pressure fuel line 11. The pre-delivery pump 12 feeds the fuel via a fuel filter 13 to a high-pressure pump 14 which is driven by the internal combustion engine 10 and which compresses the fuel and feeds it into a high-pressure accumulator 15, referred to as the rail, under high pressure via a high-pressure fuel line 28. This high-pressure accumulator 15 has, in addition to the storage of pressure, also the essential function of smoothing, by means of a sufficiently large storage volume, pressure pulsations which are produced by the pump strokes of the high-pressure pump.

In order to be able to set the fuel volume flow of the high-pressure pump 14 into the high-pressure accumulator 15 in accordance with the respective operating conditions of the internal combustion engine BKM as a function of demand, an additional intake throttle valve or digital inlet valve, referred to below as a volume flow control valve VCV, is arranged in the fuel line 11 between the pre-delivery pump 12 and the high-pressure pump 14, with the aid of which volume flow control valve VCV the delivery flow of the high-pressure pump 14 can be controlled. This volume flow control valve VCV is actuated by a control unit 16 via a control line 17. The control unit 16 may be integrated into an electronic control device 18 of the internal combustion engine BKM, which control device 18 performs open-loop and/or closed-loop control of all the sequences necessary to operate the internal combustion engine BKM. For this purpose, a multiplicity of input signals ES which are picked up by means of a corresponding sensor system are fed to the control device 18 of the internal combustion engine BKM, from which input signals ES output signals AS are generated which are used to actuate individual actuators and components which are necessary to operate the internal combustion engine BKM. The control unit 16 has, inter alia, a memory 31 in which, inter alia, characteristic curves and characteristic diagrams KF1, KF2, KF3, whose meaning will be explained later by means of the descriptions relating to FIGS. 2 and 3, are stored.

In order to be able to set the pressure in the high-pressure accumulator 15 in accordance with the desired operating conditions of the internal combustion engine BKM, an electrically actuatable pressure control valve PCV is connected into the high-pressure fuel line 28 downstream of the high-pressure pump 14. This pressure control valve PCV removes, under open-loop and/or closed-loop control, excess fuel, not required to maintain a desired pressure in the high-pressure accumulator 15, into the fuel reservoir container 10 via a fuel return line 19 (illustrated by dashed lines), wherein the pressure control valve PCV is actuated by the control unit 16 via a control line 20. In order to control the pressure in the high-pressure accumulator 15, a pressure sensor 21 is provided. This pressure sensor 21 serves to measure the pressure p which prevails instantaneously in the high-pressure accumulator 15 and on the basis of which the control unit 16 performs the pressure control via the pressure control valve PCV in accordance with the desired operating conditions of the internal combustion engine BKM.

Fuel pressures from 0 to 2000 bar or more can be generated in the high-pressure accumulator 15 using the illustrated arrangement. These fuel pressures are connected via fuel injection lines 22 to injection valves which are referred to as injectors 23 and which are arranged in the combustion chambers of the internal combustion engine BKM. The injectors 23 generally have an injection nozzle which is closed off by a needle which is under spring force. The injection process is triggered by the control unit 16 which is connected to the injectors 23 via control lines 24. The leakage current which occurs in the injectors 23 is fed back into the fuel reservoir container 10 via fuel return lines 25 (represented by dashed lines).

In one embodiment, the pre-delivery pump 12 is driven by means of an electric motor which is connected to the control unit 16 via a control line 27.

During the normal operating mode, i.e. outside the stop/start operating mode of the internal combustion engine BKM, a certain pressure and a certain delivery capacity are set in the high-pressure accumulator injection system as a function of the operating point by means of the corresponding actuation of the hydraulic actuators, volume flow control valve VCV and pressure control valve PCV, by means of what is referred to as a closed-loop system.

When the internal combustion engine BKM is deactivated manually by activating the ignition key or the deactivation button, the pressure control valve PCV is opened in order to allow the fuel to flow out of the high-pressure accumulator. The volume flow control valve VCV remains open for a short time after the deactivation of the internal combustion engine BKM during the running-on of the control unit 16 in order to fill the pump chamber of the high-pressure pump 14 again. As a result, when the internal combustion engine BKM starts again the filling of this dead space is eliminated, which leads to more rapid operational readiness of the high-pressure accumulator injection system.

The pressure control valve PCV is normally open, i.e. when the internal combustion engine BKM is deactivated it is switched to a currentless state. The volume flow control valve VCV is normally closed, with the result that after the expiry of the run-on time as a result of the power supply being switched off, the fuel feed line 11 to the high-pressure pump 14 is interrupted. When the voltage supply fails, both valves therefore assume a safe state.

In addition, a starter device 33 for electrically starting is assigned to the internal combustion engine BKM and is coupled to the crankshaft of the internal combustion engine BKM. The starter device 33 can comprise here, for example, a conventional starter or what is referred to as an integrated starter generator.

A plurality of characteristic-diagram-based engine control functions are implemented on a software basis in the control device 18 of the internal combustion engine BKM. In particular, what is referred to as an automatic stop/start function 26 is implemented in the control device 18, said automatic stop/start function 26 being used, given certain operating conditions and/or requirements, to automatically stop the internal combustion engine independently of a driver of the motor vehicle which is driven with the internal combustion engine, and to start said internal combustion engine given certain conditions and/or requirements.

The automatic stop/start function 26 is electrically connected to the starter device 33 for this purpose.

If the internal combustion engine BKM is in a stop phase within a stop/start cycle, it is necessary, when a pressure holding function and a normally open pressure control valve PCV are used, also to apply an electric current to said pressure control valve PCV during the entire stop phase. If a fuel pressure in the system is held over the entire stop phase, also referred to as a pressure holding phase (for example 60-90 seconds in duration) which is above the corresponding holding pressure, specifically at least the injection release pressure of the injectors used, the pressure control valve PCV must be energized in order to avoid fuel being removed from the pressure accumulator 15 through the pressure control valve PCV. During the stop phase, electrical power is consumed as a result of the necessary energization of the pressure control valve PCV. A level of this power varies depending on the valve type used.

FIG. 2 is a diagram showing the relationship between the pressure p and the actuation current I of a normally open pressure control valve PCV used in the high-pressure accumulator fuel injection system according to FIG. 1. The holding pressure is denoted by the reference symbol PH. Said holding pressure is approximately 70 bar in this pressure control valve PCV. In order to hold a pressure p in the high-pressure accumulator 15 of 1800 bar, a current of 0.8 ampere is necessary in this pressure control valve PCV, while to hold a pressure p of 750 bar in the high-pressure accumulator 15 only a current of 0.4 ampere is necessary.

This pressure/current diagram is stored as a characteristic curve KF1 in the memory 31 of the control unit 16.

If the pressure p in the high-pressure accumulator 15 drops during the stop phase owing to leakages at the injectors 23, the value of the electric current I can also be reduced in order to reduce the pressure control valve PCV in accordance with the pressure/current characteristic curve KF1 according to FIG. 2.

For this purpose, the pressure p in the high-pressure accumulator 15 is interrogated by means of the pressure sensor 21 in a fixed time pattern, for example every 10 ms, and the associated value for the electric actuation current I, with which the pressure control valve PCV is then actuated, is read out of the characteristic curve KF1. As the length of the stop phase increases, the actuation current I is incrementally decreased in accordance with the pressure/current characteristic curve KF1, with the result that the power consumption of the pressure control valve PCV is reduced during the stop phase.

In order to ensure that the energization of the pressure control valve PCV is sufficient to hold the instantaneous pressure p in the pressure accumulator 15 under all circumstances, the value which is read out from the characteristic curve KF1 for the actuation current I can still be used with a small upward safety margin, i.e. a somewhat larger value for the actuation current I. This may be carried out, for example, by means of an additive correction factor >0 or a multiplicative correction factor >1, which is applied to the read-out value.

Furthermore, the temperature T of the fuel can also be taken into account in the determination of the pressure-dependent actuation current I. For this purpose, instead of the characteristic curve KF1 a characteristic diagram KF2 in which the actuation current I is represented as a function of the pressure p and of the fuel temperature T in a three-dimensional coordinate system is stored in the memory 31. The temperature T of the fuel is determined by means of a temperature sensor 34 which is installed in any case in the high-pressure fuel accumulator injection system 1, the signal of which temperature sensor 34 is fed to the control device 18 and the control unit 16. A temperature model calculates the fuel temperature in the rail from the signal of this temperature sensor 34 which is present on the low pressure side, inter alia taking into account the compression heating, due to the pressure in the rail.

Since the pressure p in the pressure accumulator 15 drops during the pressure holding phase owing to the slight leakage which is present, what is referred to as the pressure reduction curve of the high-pressure accumulator fuel injection system 1 can also be used to determine reduced values for the energization of the pressure control valve 15. Said pressure reduction curve describes the chronological profile of the pressure p after the internal combustion engine BKM has been deactivated by means of the automatic stop/start function.

In the diagram KF3 according to FIG. 3, a typical pressure reduction curve (characteristic curve KF3) of a 4-cylinder diesel internal combustion engine is shown. The profile is dependent, inter alia, on the level of the continuous leakage of the injectors and the number of injectors. This pressure reduction curve is determined experimentally and is stored in the memory 31 of the control unit 16.

When the internal combustion engine BKM is deactivated by means of the automatic stop/start function 26 the pressure p in the high-pressure accumulator 15 is determined, for example measured by means of the pressure sensor 21, and this value serves as an input value (the starting value) $p_s$ for the pressure reduction curve. After the expiry of a predetermined time period, for example 100 ms, the pressure value p which is associated with this time is read out of the characteristic curve KF3. This value of the pressure is then an input variable for the pressure/current diagram (characteristic curve KF1) from which the associated value of the actuation current I is obtained. This procedure is repeated periodically, for example every 100 ms, with the result that as the duration of the stop phase of the internal combustion engine BKM continues to increase the electric current can be reduced further. In this method, the influence of the fuel temperature on the level of the current value to be selected can also be taken into account in that, for example when the internal combustion engine is deactivated, the temperature T of the fuel prevailing at this time is determined and different pressure reduction curves are stored for various temperatures T, from which curves the suitable one is then selected.

What is claimed is:

1. A method for operating a high-pressure accumulator fuel injection system for an internal combustion engine of a motor vehicle having an automatic stop/start function for deactivating and subsequently restarting the internal combustion engine independent of an intervention by the motor vehicle driver, in which fuel is fed to a high-pressure accumulator by a high-pressure pump, with at least one injector connected to the high-pressure accumulator for injecting fuel into at least one cylinder of the internal combustion engine, the method comprising:
   measuring a pressure of fuel in the high-pressure accumulator periodically during a stop phase of operation;
   correlating the measured pressure value to an actuation current value of an electrically activated pressure control valve which is open in a currentless state using a pressure/current characteristic curve;
   supplying a current to the pressure control valve at the actuation current value; and
   as the stop phase continues, adjusting the supplied current based on a pressure drop in the high-pressure accumulator and the pressure/current characteristic curve.

2. The method of claim 1, comprising restricting reduction of the level of the electric current to avoid overshooting a minimum injection release pressure of the at least one injector.

3. The method of claim 1, comprising, when the internal combustion engine is deactivated,
   (a) determining the pressure in the high-pressure accumulator and using said determined pressure as an input variable of a characteristic diagram in which a pressure reduction curve of the high-pressure accumulator fuel injector system plotted against the time is stored,
   (b) after expiry of a predetermined time period, identifying from the characteristic diagram a pressure value corresponding with the current time,
   (c) using the identified pressure value as an input variable of a characteristic diagram in which associated values of the actuation current are stored as a function of the pressure, and (d) repeating steps (b) and (c) at predetermined time intervals.

4. The method of claim 1, further comprising determining the values of the electric current based at least on a determined temperature of the fuel.

5. A device for operating a high-pressure accumulator fuel injection system for an internal combustion engine of a motor vehicle having an automatic stop/start function for deactivating and subsequently restarting the internal combustion engine independent of intervention by the motor vehicle driver, in which fuel is fed to a high-pressure accumulator by a high-pressure pump, with at least one injector connected to the high-pressure accumulator for injecting fuel into at least one cylinder of the internal combustion engine,
wherein the device is configured to:
receive a measured value for a pressure of the fuel in the high-pressure accumulator periodically during a stop phase of operation;
correlate the measured pressure value to an actuation current value of an electrically activated pressure control valve which is open in a currentless state using a pressure/current characteristic curve;
supply current to the pressure control valve at the actuation current value, and
as the stop phase continues, adjusting the supplied current based on a pressure drop in the high-pressure accumulator and the pressure/current characteristic curve.

6. The device of claim 5, configured to restrict reduction of the level of the electric current to avoid overshooting a minimum injection release pressure of the at least one injector.

7. The device of claim 5, configured to, when the internal combustion engine is deactivated,
(a) determine the pressure in the high-pressure accumulator and using said determined pressure as an input variable of a characteristic diagram in which a pressure reduction curve of the high-pressure accumulator fuel injector system plotted against the time is stored,
(b) after expiry of a predetermined time period, identify from the characteristic diagram a pressure value corresponding with the current time,
(c) use the identified pressure value as an input variable of a characteristic diagram in which associated values of the actuation current are stored as a function of the pressure, and
(d) repeat steps (b) and (c) at predetermined time intervals.

8. The device of claim 5, configured to determine the values of the electric current based at least on a determined temperature of the fuel.

9. An internal combustion engine of a motor vehicle, comprising:
at least one cylinder,
a high-pressure accumulator fuel injection system having a high-pressure accumulator, a high-pressure pump configured to feed fuel to the high-pressure accumulator, and at least one injector connected for injecting fuel into the at least one cylinder,
a control system for an automatic stop/start function for deactivating and subsequently restarting the internal combustion engine independent of intervention by the motor vehicle driver, and
a pressure control device configured to:
receive a measured value for a pressure of the fuel in the high-pressure accumulator periodically during a stop phase of operation;
correlate the measured pressure value to an actuation current value of an electrically activated pressure control valve which is open in a currentless state using a pressure/current characteristic curve;
supply current to the pressure control valve at the actuation current value, and
as the stop phase continues, adjusting the supplied current based on a pressure drop in the high-pressure accumulator and the pressure/current characteristic curve.

10. The internal combustion engine of claim 9, wherein the pressure control device is configured to restrict reduction of the level of the electric current to avoid overshooting a minimum injection release pressure of the at least one injector.

11. The internal combustion engine of claim 9, wherein the pressure control device is configured to, when the internal combustion engine is deactivated,
(a) determine the pressure in the high-pressure accumulator and using said determined pressure as an input variable of a characteristic diagram in which a pressure reduction curve of the high-pressure accumulator fuel injector system plotted against the time is stored,
(b) after expiry of a predetermined time period, identify from the characteristic diagram a pressure value corresponding with the current time,
(c) use the identified pressure value as an input variable of a characteristic diagram in which associated values of the actuation current are stored as a function of the pressure, and
(d) repeat steps (b) and (c) at predetermined time intervals.

12. The internal combustion engine of claim 9, wherein the pressure control device is configured to determine the values of the electric current based at least on a determined temperature of the fuel.

* * * * *